A. D. CATLIN.
Car-Starter.

No. 197,247.   Patented Nov. 20, 1877.

Attest:
H. W. Knight
N. P. B. Wells

Inventor:
A. D. Catlin

UNITED STATES PATENT OFFICE.

ABEL D. CATLIN, OF SENECA FALLS, NEW YORK.

IMPROVEMENT IN CAR-STARTERS.

Specification forming part of Letters Patent No. 197,247, dated November 20, 1877; application filed April 14, 1877.

*To all whom it may concern:*

Be it known that I, ABEL D. CATLIN, of Seneca Falls, in the county of Seneca and State of New York, have invented a new and useful Improvement in Street-Car Starters, which improvement is fully set forth in the following specification and accompanying drawing, in which—

Figure 4:
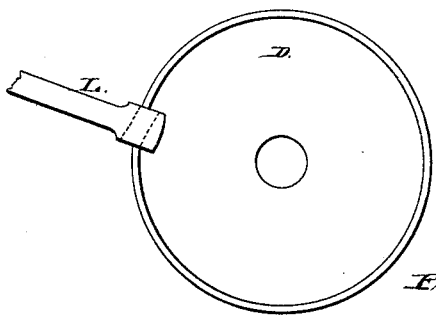
Figure 3:
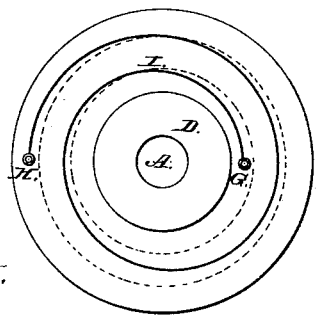
Figure 1:
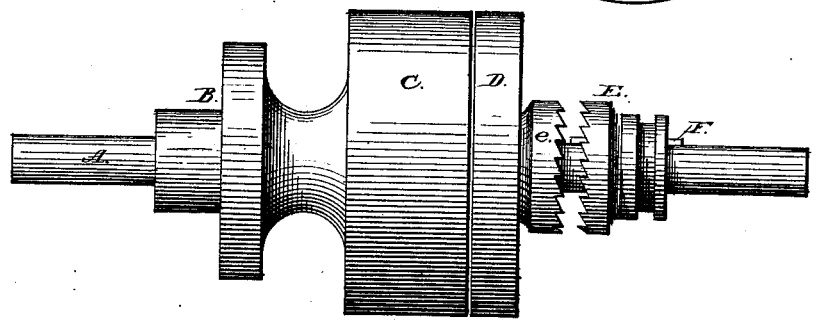
Figure 2:
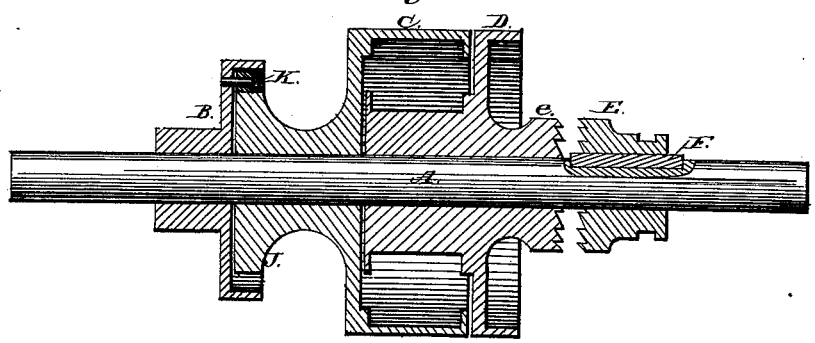

Figure 1 is a front view of an axle with my improvement attached. Fig. 2 is a longitudinal section of the same. Fig. 3 is a cross-section through spring; and Fig. 4, a cross-section through wheel D, showing position of dog L.

The object of my invention is to furnish a device by which the power required to stop a car is stored up in a spring, so that the power so stored may be used to assist in starting the car again when desired.

In the drawings, A is the axle of the car. C is a drum, loose upon the axle, and having a ratchet, J, upon one end. D is a wheel, with clutch e, as shown, also loose upon the axle. E is a clutch fitted to the axle, and made to revolve with it by means of a spline, F, but having a free longitudinal movement on the axle. B is a wheel, keyed to the axle, and carrying the pawl K, which engages with the ratchet J. I is a coiled spring, inclosed in drum C, and connected with it, as shown at H, and with wheel D, as shown at G. L is a dog working on the flange of wheel D, and allowing a free movement forward, but preventing its going backward.

The operation of my device is as follows: The clutch E being in gear with wheel D, and the brake being tightened against the drum C, the inertia of the car winds up the spring I, the resistance of which stops the car.

To start the car, the clutch E is thrown out of gear, when the dog L engages with flange of wheel D, and prevents its turning back. The dog L thus becomes the fulcrum, and the power of the spring is transmitted to the axle through ratchet J and wheel B, which starts the car.

Having thus described my invention, what I claim as new, and desire to secure by Letters Patent, is—

The coiled spring I, in connection with drum C and wheel D, operating together with clutch E, dog L, ratchet J, and wheel B, all substantially as shown and described.

ABEL D. CATLIN.

Witnesses:
H. W. KNIGHT,
N. P. B. WELLS.